United States Patent [19]
Hayashi et al.

[11] 3,921,772
[45] Nov. 25, 1975

[54] FLUID COUPLING

[75] Inventors: Masaharu Hayashi, Toyota; Saburo Fujita, Anjo, both of Japan

[73] Assignee: Aisin Seiki Kabushiki Kaisha, Japan

[22] Filed: Dec. 27, 1974

[21] Appl. No.: 536,793

[30] Foreign Application Priority Data
Dec. 27, 1973 Japan.................................. 49-3980

[52] U.S. Cl........... 192/58 B; 192/82 T; 192/113 A
[51] Int. Cl.²..................... F16D 35/00; F16D 43/25
[58] Field of Search............. 192/58 B, 82 T, 113 A

[56] References Cited
UNITED STATES PATENTS
| | | | |
|---|---|---|---|
| 3,809,197 | 5/1974 | Clancey............................ | 192/58 B |
| 3,865,221 | 2/1975 | Coty.................................. | 192/58 B |

*Primary Examiner*—Allan D. Herrmann
*Attorney, Agent, or Firm*—Oblon, Fisher, Spivak, McClelland & Maier

[57] ABSTRACT

A fluid coupling for use with a fan-cooled engine includes a shaft driven by the engine having a circular rotor fixedly connected to and rotatable therewith, a casing for supporting the shaft and for closing one side of the rotor and having cooling fins, a cover for the casing having inner and outer cooling fins, a partition plate between the cover and the other side of the rotor defining therebetween a reservoir chamber on the cover side thereof and an actuating chamber on the rotor side thereof, a viscous fluid in the chambers in preselected amounts, the partition plate being provided with an opening for transmitting fluid from the reservoir chamber to the actuating chamber and an air opening in its center, the rotor being provided with an opening for transmitting fluid to the casing, a labyrinth being provided between the casing and the rotor adjacent their outer peripheries through which the fluid is transmitted, passage means in the cover between the chambers for transmitting the fluid, and temperature-responsive means outside the cover being connected to a valve in one of the chambers for opening and closing the opening in the partition plate.

5 Claims, 2 Drawing Figures

FLUID COUPLING

BACKGROUND OF THE INVENTION

1. Field of the Invention

The present invention relates generally to a fluid coupling, and, more particularly, to a fluid coupling adapted to cooperate with a fan for cooling a vehicle engine.

2. Description of the Prior Art

In recent years, vehicle engines have been designed for use under numerous and various conditions wherein they are burdened and, therefore, the interiors of the engine rooms or housings are likely to be at very high temperaures, and further, as a consequence, the interior of a fluid coupling of an engine cooling fan therefor is also liable to be at a very high temperature. Accordingly, the viscosity of the viscous fluid within the fluid coupling is decreased. Furthermore, the fluid coupling must be inserted into a limited space of the engine housing, so that a difficult planning problem arises in order that a complicated cooling apparatus may be additionally constructed. Consequently, the number of rotations of the cooling fan at high vehicle speeds is decreased and an "overshooting phenomenon" occurs. That is, when the vehicle is accelerated immediately after starting, the temperature of the viscous fluid is low and the viscosity of the viscous fluid is great, so that the output torque exceeds a preset value. However, when the temperature of the viscous fluid is increased and the viscosity of the viscous fluid becomes relatively smaller, the output torque returns to the preset valve. Thus, the durability of the viscous fluid within the fluid coupling becomes an inferior characteristic.

SUMMARY OF THE INVENTION

It is therefore an object of the present invention to provide an improved fluid coupling for obviating the above-described conventional drawback.

Another object of the present invention is to provide an improved fluid coupling which is novel in design and low in cost, yet which avoids the overshooting phenomenon.

The foregoing and other objects are achieved according to the present invention through the provision of a fluid coupling having a fan-cooled engine including a shaft driven by the engine having a circular rotor fixedly connected to and rotatable therewith, a casing for supporting the shaft and for closing one side of the rotor and having cooling fins, a cover for the casing having inner and outer cooling fins, a partition plate between the cover and the other side of the rotor defining therebetween a reservoir chamber on the cover side thereof and an actuating chamber on the rotor side thereof, a viscous fluid in the chambers in preselected amounts, the partition plate being provided with an opening for transmitting fluid from the reservoir chamber to the actuating chamber and an air opening in its center, the rotor being provided with an opening for transmitting fluid to the casing, a labyrinth being provided between the casing and the rotor adjacent their outer peripheries through which the fluid is transmitted, passage means in the cover between the chambers for transmitting the fluid, and temperature-responsive means outside the cover being connected to a valve in one of the chambers for opening and closing the opening in the partition plate.

BRIEF DESCRIPTION OF THE DRAWINGS

Various other objects, features and attendant advantages of the present invention will be more fully appreciated as the same becomes better understood by reference to the following detailed description, when considered in connection with the accompanying drawings, wherein.

DETAILED DESCRIPTION OF A PREFERRED EMBODIMENT

Figure 1:
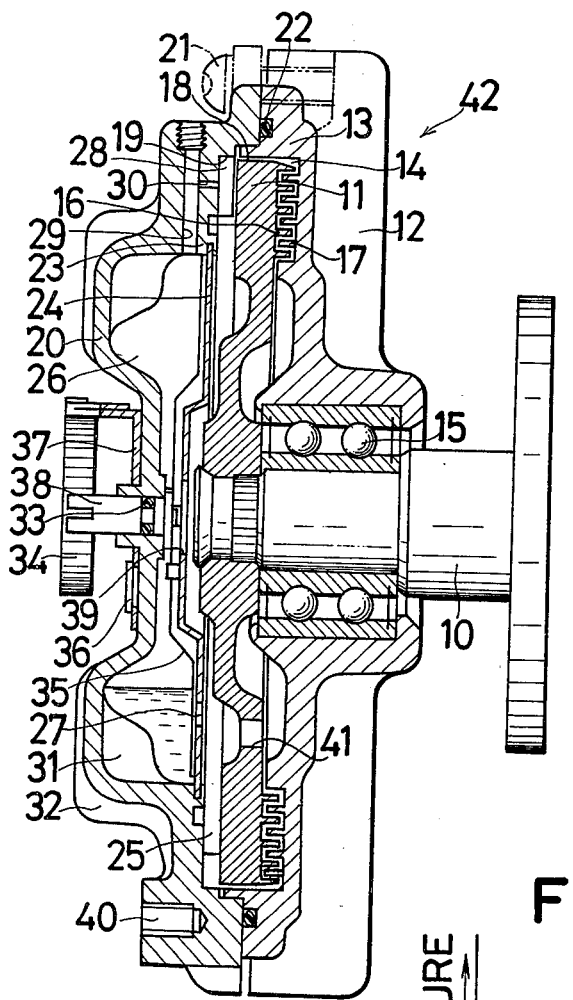
FIG. 1 is a sectional view of a fluid coupling constructed according to the present invention.

Referring now to the drawings, and more particularly to FIG. 1 thereof, the reference numeral 10 designates a driving shaft being driven, for example, by a vehicle engine, not shown. A circular rotor 11 is fixedly secured to the drive shaft 10. A casing 13 is provided at one side of the rotor 11 having a plurality of fins 12 at the outer or remote side thereof from the rotor. The casing 13 is provided with a hollow portion 14 into which the rotor 11 is inserted, and the casing 13 supports the drive shaft 10 through a bearing 15. A labyrinth is formed between the rotor 11 and the casing 13 by a plurality of projections, which may be circular in configuration, which are designated by the numeral 16 and are formed on the outer periphery of the rotor 11 and which are disposed among a plurality of torque transmitting portions or projections 17 of similar configuration so as to inter-engage or overlap with the projections 16, and which are in turn formed on the inner peripheral wall of the casing 13, whereby the torque is fluidically transmitted from the rotor 11 to the casing 13 according to the viscosity of the viscous fluid being carried between the projections 16, 17.

A cover 20 is fixed on the outer open portion of the hollow portion 14 of the casing 13 by a plurality of bolts 21. A stepped hollow portion 19 is formed on the inner wall of the cover 20 adjacent the outer periphery thereof in order to form an annular gap 18 between the casing 13 and the rotor 11 enclosed therein. The casing 13 and the cover 20 are sealably connected through a seal ring 22. A partition plate 24 which is fixed to an inner stepped shoulder portion 23 of the cover 20 is inserted into a space between the rotor 11 and the cover 20 to thereby form an actuating chamber 25 on the one side between the rotor 11 and the partition plate for inserting the rotor 11 and a reservoir chamber 26 on the other side between the partition plate and the cover 20. A hole 27 is formed in the partition plate 24 in the lower region thereof, in its operational orientation, as shown in FIG. 1, for transmitting the fluid from the reservoir chamber 26 to the actuating chamber 25.

A radial passage 29 and an axial hole 30 are formed in the cover 20 for transmitting the fluid from the actuating chamber 25 to the reservoir chamber 26 when the fluid within the actuating chamber 25 transmitted through the labyrinth 16, 17 and then through the annular gap 18 strikes against a projecting portion 28 projected from the inner end portion of the cover 20 into the actuating chamber 25. Cooling fins 31, 32 are formed on the inner and outer sides of the cover 20, respectively, in order to contact the viscous fluid within the reservoir chamber 26 with the air therein. The cover is constructed so that the surface area of the outer fins 32 and the effective surface area of the inner fins 31 are substantially the same, or within the range of 1:1 and 3:1.

A temperature-responsive means 34, being rotatable responsive to temperature changes, is sealably inserted into the center of the cover 20 through a seal ring 33. A valve means 35, which opens or closes the hole 27 of the partition plate 24 according to a change of temperature in the air, is fixed to the temperature-responsive means 34 through a holder 37 fixed to the cover 20 by means of a caulk member 36 and further through a rod 38 fixed to the temperature-responsive means 34. A proper quantity of viscous fluid is included within each of the chambers 25 and 26. Both chambers 25 and 26 are communicated through an air communicating hole 39 formed in the center of the partition plate 24. A plurality of holes 40 are bored within the cover 20 for attaching a fan, not shown, thereto and a hole 41 for the viscous fluid is formed on the rotor 11, whereby a fluid coupling, generally designated by reference numeral 42, of the present invention is constructed.

The operation of the invention will now be described hereinbelow in greater detail.

When the temperature of the engine, not shown, rises, and also when the temperature of the open air rises, the change of the temperature is sensed by the temperature-responsive means 34 and the temperature-responsive means 34 is rotated, thereby rotating the valve means 35 through the holder 37 and the rod 38. Accordingly, the hole 27 of the partition plate 24 is gradually opened by the rotating movement of the valve means 35 and the fluid within the chamber 26 is transmitted into the chamber 25 through the hole 27 of the partition plate 24. The fluid transmitted into the chamber 25 is circulated within the chamber 25 by the rotation of rotor 11, especially through the labyrinth 16, 17 and gap 18, and further collides with the projecting portion 28 of the cover 20 and a pressure force is thus obtained, whereby the pressured fluid is reduced within the chamber 26 through the hole 30 and the passage 29. The fluid within the actuating chamber 25 is transmitted to the cover 20 fitted to the casing 13 by the rotating torque of the rotor 11 through the hole 41, the labyrinth formed by projections 16 and the torque transmitting portion 17, and the cooling fan, not shown, fixed to the cover 20 is rotated, thereby to ventilate a quantity of air responsive to the temperature of the engine, not shown, to cool the engine with the atmospheric air.

In opposition, when the temperature of the surrounding air becomes lower, the change of the temperature is sensed by the temperature-responsive means 34 and the temperature-responsive means 34 is thus rotated, thereby to rotate the valve means 35 through the holder 37 and the rod 38. Accordingly, the hole 27 of the partition plate 24 is closed by the rotating movement of the valve means 35 and the viscous fluid within the actuating chamber 25 is transmitted into the reservoir chamber 26 through the hole 30 and the passage 29 so that the viscous fluid within the actuating chamber 25 is decreased and also the rotating torque transmitted from the rotor 11 to the casing 13 and the cover 20 is decreased and the rotation of the cooling fan, not shown, thus becomes weak such that the cooling operation of the engine also is decreased. That is to say, the rotational speed of the cooling fan is changed in accordance with the change of the temperature of the engine, and also the cooling operation for the engine is changed. The viscous fluid within the rservoir chamber 26 is radiated and cooled to the outside through the cooling fins 31, 32 formed respectively on the inner and outer sides of the cover 20.

Figure 2:
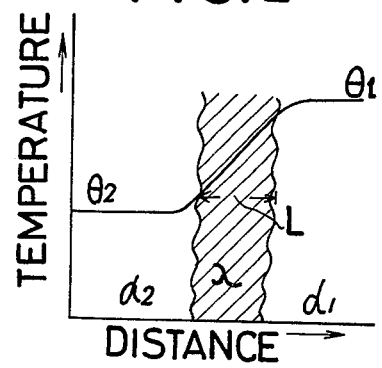
FIG. 2 is a diagrammatic view showing the relationship of the temperature between the viscous fluid and the open air.

The relationship of the temperature among the fluid coupling 42, the viscous fluid and the open air is as shown in FIG. 2 and the mathematics involved in computing the same is as follows;

$$\theta_1 = \theta_2 + \{2L/\lambda(A+B) + 1/A\alpha_1 + 1/B\alpha_2\} Q/t,$$

where $\theta_1$ is the temperature within the fluid coupling 42,
$\theta_2$ is the temperature of the atmospheric air,
$L$ is the thickness of the cover 20,
$\lambda$ is the heat conductivity of the cover 20,
$\alpha_1$ is the heat conductivity of the viscous fluid within the fluid coupling 42,
$\alpha_2$ is the heat conductivity of the air,
$A$ is the surface area of the inner fins 31,
$B$ is the surface area of the outer fins 32, and
$Q/t$ is the calorific value per unit time.

In proportion, as the surface area A of the inner fins 31 for cooling becomes smaller in the above-mentioned mathematics, the value of $1/A\alpha_1$ becomes larger, and also the temperature $\theta_1$ within the fluid coupling 42 becomes high. Namely, in the case that the inner fins 31 are attached to the inner side of the fluid coupling 42 for cooling, this case of the invention has a greater effect than in the case where the inner fins 31 are not attached to the inner side of the fluid coupling 42 for cooling.

When the inner and outer fins 31, 32 are attached to the inner and outer sides of the fluid coupling 42, the most effective ratio of the surface area of the inner and outer fins 31 32 of the fluid coupling 42 for cooling is formularized as follows:

$\theta_2$, $L$, $\lambda$, $\alpha_1 = 400$ kcal / m² hr°C,
$\alpha_2 = 100$ kcal / m² hr° C Q/t
are respectively constant and the space for attaching the fins 31, 32 is limited so that $A + B = k$ (constant).

If $T = 210 \, k(1/A\alpha_1 + 1/B\alpha_2)$ then T becomes as follows:

In the case of $A = 1 / 8k$, $T = 6.60$ (m² hr° C/ kcal);
In the case of $A = 1 / 4k$, $T = 4.90$ )m² hr° C/ kcal);
In the case of $A = 3 / 8k$, $T = 4.76$ (m² hr° C/ kcal);
In the case of $A = 1 / 2k$, $T = 5.25$ (m² hr° C/ kcal);
In the case of $A = 5 / 8k$, $T = 6.24$ (m² hr° C/ kcal);
In the case of $A = 3 / 4k$, $T = 9.10$ (m² hr° C/ kcal); and
In the case of $A = 7 / 8k$, $T = 17.40$ (m² hr° C/ kcal).

In proportion, as the value of T becomes small, the value of $\theta_1$ becomes small, so that the most effective ratio for cooling the fluid coupling 42 between both surface areas of inner and outer fins 31, 32 is about 1:1 to 1:3.

In this embodiment, the cooling fins 31, 32 are provided on the inner and outer sides of the cover 20 and the ratio of the surface area of both fins 31, 32 is the value within the predetermined range, however, it can be possible that the cooling fins 31, 32 are provided on the inner and outer sides of the casing 13 for including the viscous fluid, thereby taking effect for cooling the fluid coupling 42.

The fluid coupling 42 of the invention may be utilized not only for cooling the vehicle engine, but also in other technical fields.

Various other modifications and variations of the present invention are obviously possible in light of the above teachings. It is to be understood, therefore, that within the scope of the appended claims, the present invention may be practiced other than as specifically described herein.

What is claimed as new and desired to be secured by Letters Patent of the United States is:

1. A fluid coupling for use with a fan-cooled engine comprising:
   a shaft driven by the engine;
   a circular rotor fixedly connected to and rotable with said shaft;
   a casing for supporting said shaft disposed on one side of said rotor and having cooling fins on the side remote from said rotor;
   a cover for said casing disposed on the side of said rotor remote from said casing being connected to said casing and having inner and outer cooling fins;
   a partition plate disposed between said cover and said rotor and defining therebetween a reservoir chamber on the cover side thereof and an actuating chamber on the rotor side thereof;
   a viscous fluid in the chambers in preselected amounts;
   said partition plate having an opening for transmitting fluid from said reservoir chamber to said actuating chamber;
   said rotor having an opening for transmitting said viscous fluid to said casing;
   said casing and said rotor having means disposed adjacent their respective mutually facing outer peripheries defining a labyrinth through which said viscous fluid is transmitted;
   passage means in said cover connecting said reservoir chamber and said actuating chamber for transmitting fluid therebetween;
   valve means for controlling said fluid transmitting opening in said partition plate; and
   temperature-responsive means outside said cover being connected to said valve means for opening and closing the fluid transmitting opening in said partition plate.

2. A fluid coupling as set forth in claim 1, wherein said cover further comprises a projecting portion projecting from an inner wall of the periphery thereof adjacent said passage means therethrough.

3. A fluid coupling as set forth in claim 2, being further characterized by the ratio between the effective surface area of said inner cooling fins and the effective surface area of said outer cooling fins of said cover being between 1:1 and 1:3.

4. A fluid coupling as set forth in claim 3, wherein said partition plate further has a central air communicating hole formed therein.

5. A fluid coupling as set forth in claim 3, wherein the outer peripheral edge of said rotor and the inner peripheral edge of said casing form an annular gap therebetween.

* * * * *